United States Patent
Protopopov et al.

(10) Patent No.: US 10,584,999 B2
(45) Date of Patent: Mar. 10, 2020

(54) HIGH POWER SUPERCONTINUUM FIBER OPTICAL SOURCE WITH MIDSTAGE SPECTRUM BROADENING

(71) Applicant: SA Photonics, Inc., Los Gatos, CA (US)

(72) Inventors: Vladimir Protopopov, San Jose, CA (US); Greg G. Mitchell, Elk Grove, CA (US); James F. Coward, Washougal, WA (US)

(73) Assignee: SA Photonics, Inc., Los Gatos, CA (US)

( * ) Notice: Subject to any disclaimer, the term of this patent is extended or adjusted under 35 U.S.C. 154(b) by 0 days.

(21) Appl. No.: 15/939,049

(22) Filed: Mar. 28, 2018

(65) Prior Publication Data

US 2020/0041870 A1    Feb. 6, 2020

(51) Int. Cl.
*G01J 3/02* (2006.01)
*G02F 1/35* (2006.01)
*G08B 29/28* (2006.01)

(52) U.S. Cl.
CPC .... *G01J 3/0245* (2013.01); *G02F 2001/3528* (2013.01); *G02F 2203/70* (2013.01); *G08B 29/28* (2013.01)

(58) Field of Classification Search
CPC ............ G02B 6/02376; G02B 6/02347; G02B 6/02333; G02B 6/02214; G02B 6/03633; G02B 6/02338; G01B 9/02091; G01B 9/02007; H01S 3/0092; H01S 3/094076; H01S 3/09415; H01S 3/113; H01S 3/1611; H01S 3/1312; H01S 3/11; H01S 3/06741; H01S 3/06745; H01S 3/06725; G02F 2001/3528; G02F 2202/32; G02F 1/365; G02F 1/353
See application file for complete search history.

(56) References Cited

U.S. PATENT DOCUMENTS 6,125,225 A * 9/2000 Dianov ................ G02B 6/2552
                                            385/124
9,958,606 B2 * 5/2018 Thomsen ............ H01S 3/06741
(Continued)

OTHER PUBLICATIONS

Knight, J.C., "Photonic Crystal Fibers and Fiber Lasers (Invited)," J. Opt. Soc. Am. B, Aug. 2007, pp. 1661-1668, vol. 24, No. 8.

*Primary Examiner* — Ellen E Kim
(74) *Attorney, Agent, or Firm* — Fenwick & West LLP

(57) ABSTRACT

Embodiments relate to a high power supercontinuum (SC) fiber optical source. The SC fiber optical source includes a prebroadening optical fiber that broadens the spectrum of a lower power intermediate optical signal before final amplification. The spectrum broadening creates spectral components which facilitate further spectrum broadening of amplified signal in final nonlinear stage, allowing to achive flatter and wider spectrum, and reduces nonlinear Stimulated Brillouin Scattering (SBS) that could damage SC fiber optical source components or limit the output power of the SC fiber optical source signal, thus enabling higher output power. After amplification in booster, passing at least part of broadened spectrum, the optical signal spectrum is further broadened by injecting the optical signal into a nonlinear stage to create a SC optical signal.

21 Claims, 3 Drawing Sheets

(56) References Cited

U.S. PATENT DOCUMENTS

2014/0204456 A1* 7/2014 Chavez-Pirson ....... C03C 3/122
    359/326
2016/0156148 A1* 6/2016 Thomsen ............ H01S 3/06741
    356/72

\* cited by examiner

HIGH POWER SUPERCONTINUUM FIBER OPTICAL SOURCE WITH MIDSTAGE SPECTRUM BROADENING

STATEMENT REGARDING FEDERALLY SPONSORED RESEARCH OR DEVELOPMENT

This invention was made with government support under Phase II SBIR contract # FA8650-15-C-1857 with the United States Air Force, Air Force Research Laboratory. The government has certain rights in the invention.

BACKGROUND

1. Technical Field

This disclosure relates generally to supercontinuum optical sources, and more particularly, to high power supercontinuum optical sources that implement some spectrum broadening before final amplification and supercontinuum generation.

2. Description of Related Art

Supercontinuum (SC) fiber optical sources are fiber optical sources with broad output spectrum. Generally, a SC fiber source first produces a high power optical signal with a narrow spectral line (i.e., unbroadened spectrum). A nonlinear stage then broadens the spectrum.

However, this conventional approach has limitations if a high power output is desired. For example, photonic crystal fibers (PCFs) are sometimes used to provide spectrum broadening. However, PCFs are fragile compared to standard solid fibers. The solid core of a PCF is typically too small to accommodate high power optical signals. In addition, the splice between a PCF and standard fiber often is vulnerable to energy losses and structural stresses, and high power optical signals can crack or burn the splice point. Consequently, conventional SC fiber sources based on PCFs are limited in output power.

In addition, at higher powers, Stimulated Brillouin Scattering (SBS) can prevent optical signals from propagating in optical fibers and can damage optical components. This also provides a natural power limit on conventional SC fiber optical sources.

As a result, there is a need for different approaches to SC fiber sources that can achieve higher output powers.

SUMMARY

The present disclosure overcomes the limitations of the prior art by partially broadening the spectrum of the optical signal before final amplification and supercontinuum (SC) generation. In this approach, a SC optical source includes a prebroadening fiber that does some spectrum broadening, followed by a boost amplifier, and then a nonlinear fiber that does the majority of the spectrum broadening. The prebroadened signal includes new wavelength components, which will become seed signals for further broadening in the nonlinear fiber. Thus, the prebroadening allows the boost amplifier to achieve a smoother and wider spectrum than it would if an optical signal with a narrow spectral line were input to the boost amplifier. Additionally, prebroadening reduces Stimulated Brillouin Scattering (SBS) and thus suppresses back reflection compared to a SC source without prebroadening.

In some embodiments, the prebroadening fiber is a photonic crystal fiber (PCF) and the final nonlinear fiber is a solid core fiber, such as a pure silica fiber or a germanium (Ge) doped fiber.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Embodiments relate to a high power supercontinuum (SC) fiber optical source. The SC optical source includes at least one prebroadening optical component that broadens the spectrum of the optical signal between amplification stages. The spectrum broadening facilitates further broadening in a nonlinear stage, and reduces Stimulated Brillouin Scattering (SBS), that could damage SC optical source components or limit the output power of the SC signal. After final amplification, the optical signal spectrum is broadened by the nonlinear stage to create the output SC optical signal. The prebroadening allows the SC optical source to achieve a broad spectrum that is flatter and smoother than a SC optical source without prebroadening.

Figure 1:
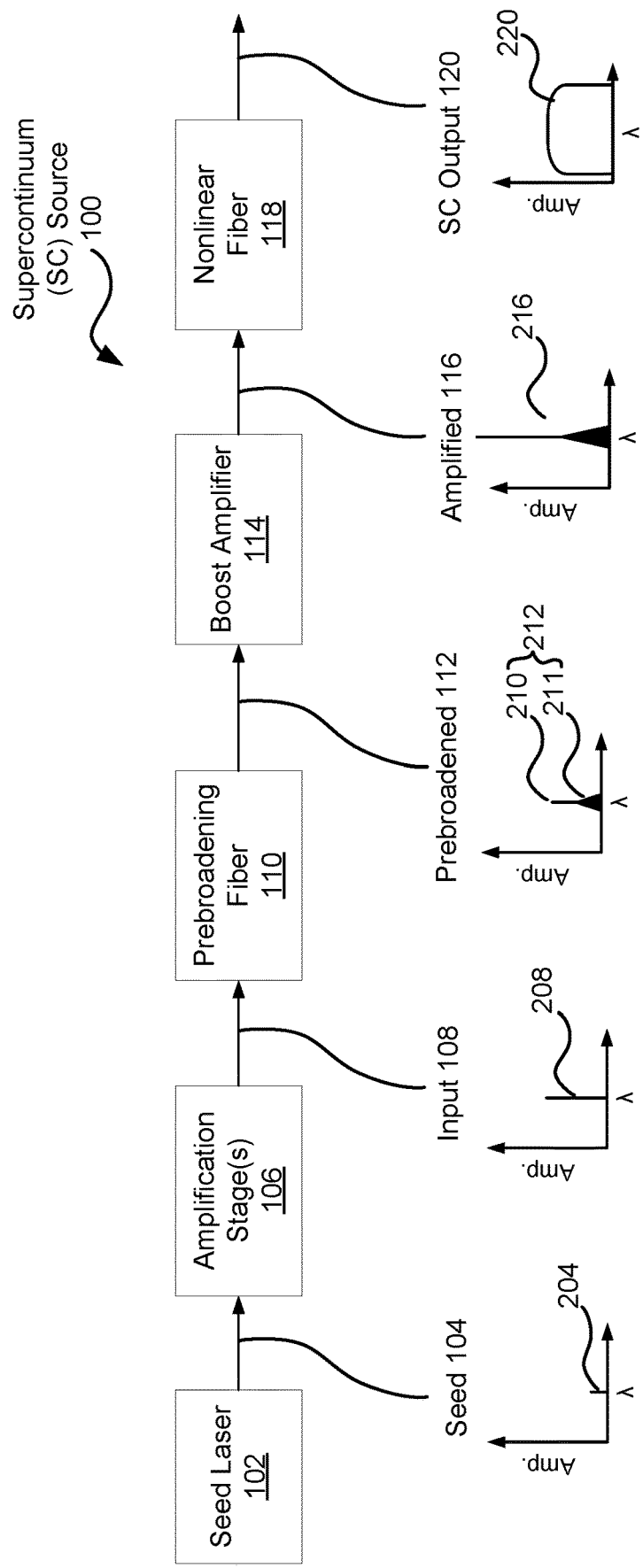
FIG. 1 is a diagram of a supercontinuum (SC) optical source illustrating amplification and spectrum broadening, according to an embodiment.

FIG. 1 is a diagram of a supercontinuum (SC) optical source illustrating amplification and spectrum broadening, according to an embodiment. The top portion of FIG. 1 is a block diagram of components of the supercontinuum (SC) optical source 100. The SC optical source 100 includes a seed laser 102, amplification stage(s) 106, a prebroadening fiber 110, a boost amplifier 114, and a nonlinear fiber 118. The optical signal produced by each stage is given a name for convenience: the seed optical signal 104, input optical signal 108, prebroadened optical signal 112, amplified optical signal 116, and supercontinuum (SC) or output optical signal 120. Below each name is a figure showing the spectrum of the optical signal at that point. Spectrum 204 is the spectrum of the seed optical signal 104, spectrum 208 is the spectrum of the input optical signal 108, and so on. In these spectral plots, the x-axis is wavelength and the y-axis is amplitude. In alternative embodiments, different and/or additional components may be included in the SC optical source 100. For clarity, various details are omitted from FIG.

1. For example, splice points or other optical coupling between the stages are not shown.

Figure 2:
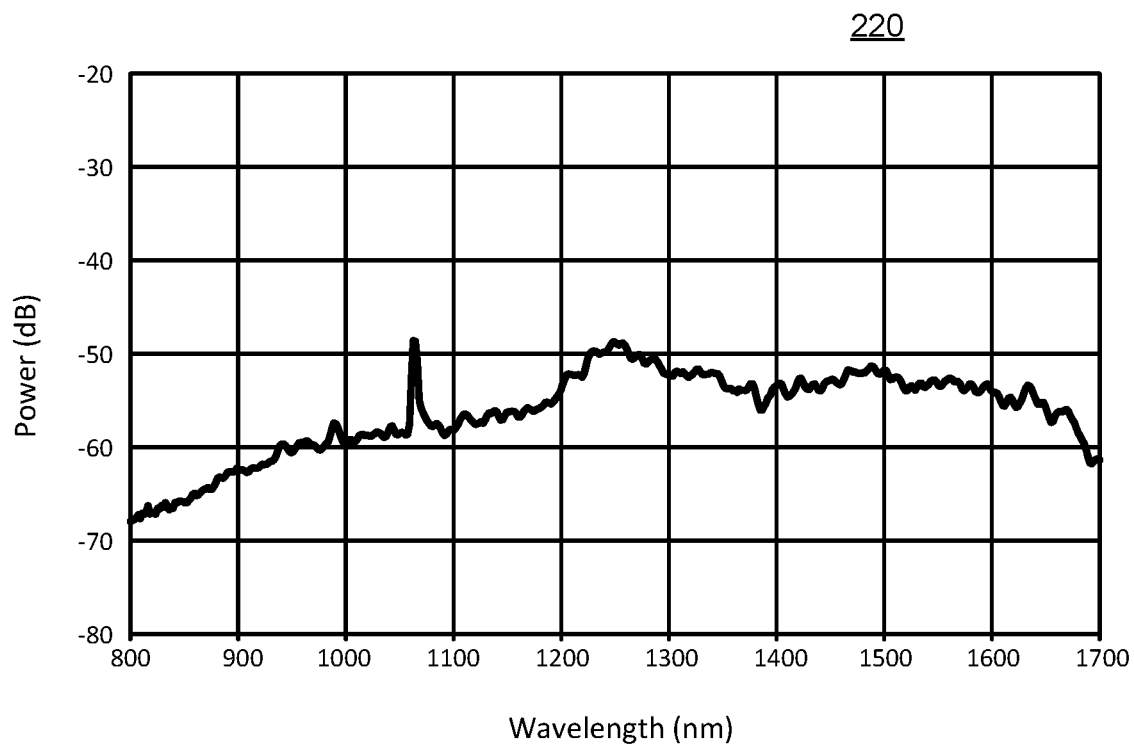
FIG. 2 is a graph of a SC spectrum from the SC optical source, according to an embodiment.

The SC optical source 100 operates as follows. Consider first the last three stages 110-118. The input 108 to these final stages has a spectrum 208 characterized by a single narrow spectral line and relatively low power. In this example, the spectrum 208 is centered at 1064 nanometers (nm) with a width ranging between 0.01 nm to 1 nm and a power of a few Watts. The output optical signal 120 of these three stages has a supercontinuum spectrum 220 that is both much higher in power and much broader in spectrum. For example, the output power may be several hundred Watts and the spectrum 220 width may be 1500 nm. FIG. 2 shows an example output spectrum 220. The input optical signal 108 is injected into the prebroadening fiber 110 for spectrum broadening. The prebroadening fiber 110 broadens the spectrum 208 of the input optical signal 108 by creating new spectral components to stimulate further broadening in the nonlinear fiber 118 and to reduce SBS effects that may occur in the boost amplifier 114 or the nonlinear fiber 118. Because this spectrum broadening occurs before the boost amplifier 114, it will be referred to as prebroadening.

The amount of spectrum prebroadening depends on the desired final output power, spectrum shape, optical pulse parameters, etc. For example, in a SC optical signal with long pulses, longer than few nanoseconds (ns), the SBS threshold may be low enough to limit the output power of the optical signal. In such a case, prebroadening of 1-10 nm may be sufficient to overcome this problem and suppress SBS.

In another example, if Raman scattering is the dominant nonlinear effect in the nonlinear fiber 118, the prebroadening may be set such that it is wider than the distance between the Raman peaks (e.g., 50-100 nm). This will smooth the Raman peaks in the final output spectrum 220.

In another example, if one desires a high power output signal 120, the nonlinear fiber 118 can be a solid core fiber. In this case, the prebroadening fiber 110 may broaden the spectrum of the input optical signal 108 to its final desirable width. To do this, the prebroadening fiber 110 can be a highly nonlinear photonic crystal fiber (PCF) that is long enough for the desired broadening. PCFs are further described below.

An example of a prebroadening fiber 110 is a photonic crystal fiber (PCF). A PCF can have a zero dispersion wavelength that is shorter (e.g., 1040 nm) than standard optical fibers with solid material structures (e.g., pure silica fibers or germanium (Ge) doped fibers). The structure of the PCF is designed such that it has a zero disperion wavelength close to the signal wavelength (e.g., the input signal 108 wavelength). This allows the PCF to prebroaden the input spectrum 208 on both sides of the spectral line (e.g., symmetrically) without the PCF limiting the power of the SC output optical signal 120. Alternatively, if the wavelengths of the input 108 signal lie in the anomalous dispersion region (e.g., longer than 1270 nm for pure silica), the prebroadening fiber 110 can be a pure silica or Ge doped solid core fiber.

Figure 3:
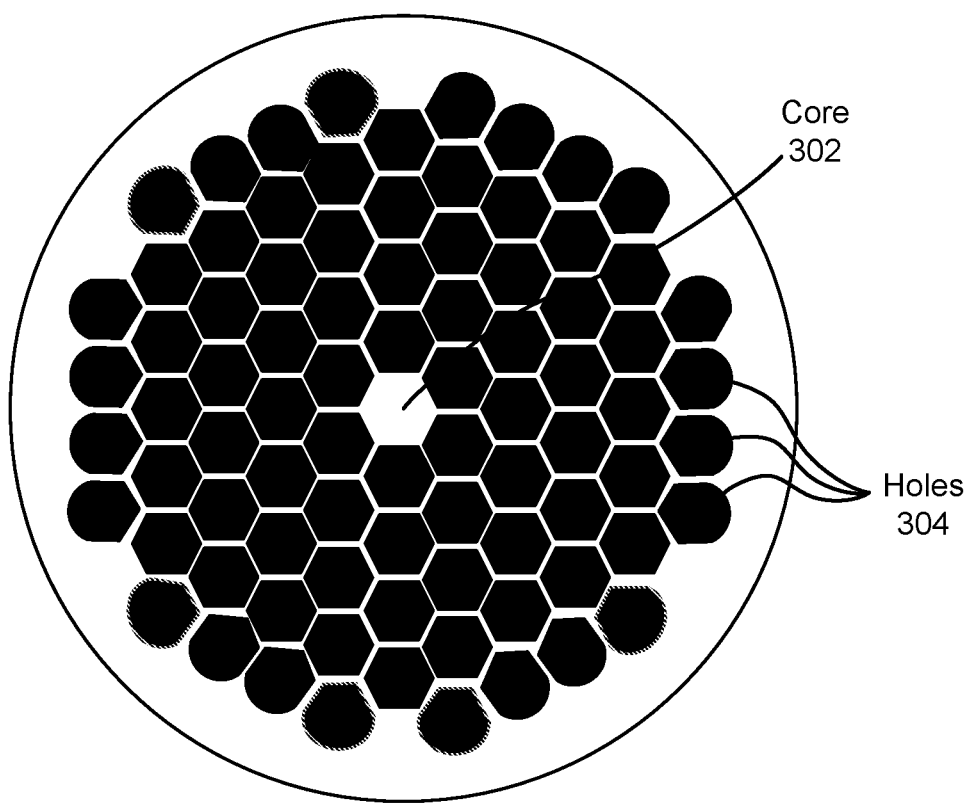
FIG. 3 (prior art) is a cross-section of a photonic-crystal fiber (PCF), according to an embodiment.

FIG. 3 (prior art) is a cross-section of a PCF. The PCF includes a solid core 302, for example made of pure silica. It also includes a microstructure array of holes 304 running along the length of the PCF. The holes 304 can be filled with air, although other gases may be pumped into the holes. The PCF in FIG. 3 can have a zero dispersion wavelength at 1040 nm and a core size of 4 microns (um).

The spectrum 212 of the prebroadened optical signal includes a spectral line 210, which is the spectral line 208 of the input optical signal 108 but reduced in amplitude. The reduction in power is due to the spectrum prebroadening (some power transfers from the signal line 208,210 to a spectral background 211, which can occur on both sides of the spectral line 210) and due to some permanent power loss (e.g., due to power dissipation from the Raman process). The spectrum broadening can be between 1 and 1500 nm (or even more), depending on the application. The fraction of power from the spectral line 208 that goes into the spectral background 211 can be between 10% and 100%. If the prebroadening fiber 110 is a passive fiber, then the power in spectrum 212 will be equal to or less than the power in the input spectral line 208. In some embodiments, the prebroadening fiber 110 can be an active fiber if it has a sufficient nonlinear coefficient and a properly chosen dispersion and thus fulfills both prebroadening and amplification tasks.

The spectral background 211 serves as a seed signal for nonlinear effects, causing spectral broadening in the nonlinear fiber 118. It also reduces SBS, which may occur in the boost amplifier 114 or the nonlinear fiber 118. SBS is a nonlinear effect encountered when narrow-band optical signals (e.g., the input optical signal 108 before prebroadening) are amplified in a fiber amplifier or pass through a long optical fiber. SBS is characterized by strong back reflection of incident optical pulses and can cause damage to components of the SC optical source 100. As such, SBS can limit the power amplification of an optical signal.

SBS occurs at lower powers for optical signals with narrow spectrums. Consequently, the spectrum broadening from the prebroadening fiber 110 increases the threshold for this SBS effect. As a result, the prebroadened optical signal 112 reduces the SBS effect compared to a SC optical source 100 without prebroadening. This allows the prebroadened optical signal 112 to be amplified to higher powers than optical signals without prebroadening (e.g., compared to if the input optical signal 108 were directly input to the boost amplifier 114).

The boost amplifier 114 is an optical fiber amplifier(s) that amplifies the power of the prebroadened optical signal 112 to produce the amplified optical signal 116. The boost amplifier 114 can include optically pumped crystal amplifiers. The amplified optical signal 116 can have a power between a fraction of a Watt and hundreds of Watts. The output spectrum 216 from the boost amplifier 114 typically has a dominant spectral line with a spectral background. However, the spectrum of the prebroadened signal 212 may not undergo equal amplification. Often, the spectral line of the prebroadened signal 210 receives a higher amplification than the spectral background 211, especially compared to wavelengths of the spectral background 211 farthest from the spectral line 210, nevertheless the background components are present to some extent at the amplified spectrum 216. In some embodiments, to achieve a desired output spectrum 220, the boost amplifier 114 includes filtering components to shape the spectrum 216.

The nonlinear fiber 118 broadens the spectrum 216 of the amplified optical signal 116 to produce the SC optical signal 120 with spectrum 220. The spectrum broadening is caused by fiber nonlinearities, such as four wavelength mixing and/or the Raman effect. Typically, the nonlinear fiber 118 provides the majority of the spectrum broadening compared to the prebroadening fiber 110. This is because the prebroadening fiber 110 creates seed spectral components for final broadening within the nonlinear fiber 118. This enables the nonlinear fiber 118 is to broaden the spectrum to the desired width, smoothness (i.e., spectrum amplitude variation), and flatness.

Additionally, the nonlinear fiber 118 can accommodate the power of the amplified optical signal 116. For example, to reach output powers of hundreds of Watts, the nonlinear fiber 118 can be a solid material fiber, such as a silica fiber or a Ge doped fiber. It can have a core diameter of 5-10 um. However larger core diameters may also be used. In some embodiments, the nonlinear fiber 118 can be multimode (MM) fiber. The nonlinear fiber 118 may also be a narrow-core fiber with silica cladding, a tapered fiber, or a microstructure fiber (e.g., a PCF fiber). Furthermore, non-silica fibers, such as ZBLAN ($ZrF_4$—$BaF_2$—$LaF_3$—$AlF_3$—NaF) or chalcogenide fibers can be used for SC generation in mid- and far-infrared regions. In some embodiments, the nonlinear fiber 118 is a commercially available telecom fiber, such as a pure silica fiber. In some embodiments, the nonlinear fiber 118 has a zero dispersion wavelength 10-30 nm shorter than the pump wavelength to induce spectrum broadening through four wavelength mixing. For example, a PCF with a zero dispersion at 1040-1050 nm is pumped by an amplified signal 216 with a spectral line at 1064 nm. Additionally, a pulse modulation instability can induce extra broadening if the nonlinear fiber 118 has an anomalous dispersion at the pump wavelength.

The SC output optical signal 120 is the output of the SC fiber optical source 100. In some embodiments, the spectrum 220 of the SC optical signal 120 is 400-2000 nm wide. The SC optical signal 120 can be pulsed or continuous wave. Typically the nonlinear fiber 118 is a passive fiber, but it can also be an active fiber, for example, by combining the boost amplifier 114 with the nonlinear fiber 118. The SC optical signal 120 can be injected into additional amplifiers for additional amplification.

Returning now to the first two stages in FIG. 1, FIG. 1 shows one approach to producing the input optical signal 108, which in this example is a laser signal. The seed laser 102 produces a seed laser signal 104 that is amplified by the amplification stage(s) 106. Examples of seed lasers 102 include laser diodes, vertical-cavity surface-emitting lasers (VCSELs), short-cavity fiber lasers, and solid-state lasers (e.g., a nonplanar ring oscillator (NPRO)). The seed signal 104 can be internally (e.g., by current) or externally (e.g., by Mach-Zender modulator) modulated, continuous, or self-pulsed. The seed laser signal 104 has relatively low power with a narrow spectral line 204. For example, an indium gallium arsenide (InGaAs) laser diode can produce a seed laser signal 104 with less than 1 Watt (W) power at 1064 nm. If the amplification stage(s) 106 includes an ytterbium (Yb) fiber as active media, the spectral line of the input optical signal 108 can fall within a wavelength range of 1020-1140 nm.

One or more amplification stage(s) 106 increase the power of the seed laser signal 104 to produce the input laser signal 108. Examples of amplification stage(s) 106 include optical fibers doped with rare earth ions, such as ytterbium (Yb), neodymium (Nd), thulium (Tm), or erbium (Er). Alternatively, the amplification stage(s) 106 can include semiconductor optical amplifiers or optically pumped crystal amplifiers. In some embodiments, the seed laser 102 and amplification stage(s) 106 are components of a fiber laser or pump source.

In an example embodiment, the seed laser 102 and amplification stage(s) 106 are components of an Yb fiber laser. In this example, the seed source 102 is a 1064 nm semiconductor laser diode, externally modulated by a Mach-Zender modulator, that emits 1 ns pulses. The amplification stage(s) 106 are fiber gain stages that include Yb doped silica fibers pumped by 976 nm laser diodes. The prebroadening fiber 110 is a PCF, which increases the spectrum bandwidth to 100 nm or more. After exiting the boost amplifier 114, the amplified signal 116 is coupled to the nonlinear fiber 118 which includes a solid core silica fiber that experiences broadening due to the Raman effect. As a result, the SC output signal 220 has wide and smooth spectrum between 1000 and 2000 nm and an output power exceeding 100 Watts.

Although the detailed description contains many specifics, these should not be construed as limiting the scope of the invention but merely as illustrating different examples. It should be appreciated that the scope of the disclosure includes other embodiments not discussed in detail above. Various other modifications, changes, and variations which will be apparent to those skilled in the art may be made in the arrangement, operation, and details of the apparatus disclosed herein without departing from the spirit and scope as defined in the appended claims. Therefore, the scope of the invention should be determined by the appended claims and their legal equivalents.

What is claimed is:

1. An optical source comprising:
   a fiber amplifier that receives a seed optical signal having a wavelength spectrum comprising a spectral line, the fiber amplifier amplifying a power of the seed optical signal to produce an input optical signal, a wavelength spectrum of the input optical signal comprising a spectral line with an increased amplitude compared to the spectral line of the seed optical signal;
   a prebroadening fiber that is optically coupled to the fiber amplifier and receives the input optical signal, the prebroadening fiber broadening the wavelength spectrum of the input optical signal to produce a prebroadened optical signal, a wavelength spectrum of the prebroadened optical signal comprising a spectral line of reduced amplitude compared to the spectral line of the input optical signal and a spectral background caused by broadening of the spectral line of the input optical signal; and
   a boost amplifier optically coupled to the prebroadening fiber, the boost amplifier amplifying a power of the prebroadened optical signal to produce an amplified optical signal.

2. The optical source of claim 1, wherein the boost amplifier produces a higher amplification with the prebroadened optical signal as input, than it would with the input optical signal as input.

3. The optical source of claim 1, wherein the boost amplifier produces a higher output power with the prebroadened optical signal as input, than it would with the input optical signal as input.

4. The optical source of claim 1, wherein the boost amplifier includes a spectral filter component to shape a spectrum of the amplified optical signal.

5. The optical source of claim 1, wherein the prebroadening fiber is a photonic crystal fiber.

6. The optical source of claim 1, wherein the prebroadening fiber broadens the spectral line of the input optical signal by more than 1 nm.

7. The optical source of claim 1, wherein the prebroadening fiber broadens the spectral line of the input optical signal by more than 50 nm.

8. The optical source of claim 1, wherein a power in the spectral background is more than 10 percent of a power in the spectral line of the input optical signal.

9. The optical source of claim 1, wherein the boost amplifier is a rare earth ion doped fiber.

10. The optical source of claim 1, wherein the spectral line of the input optical signal falls within a wavelength range of 1020-1140 nm.

11. The optical source of claim 1, further comprising:
a seed laser optically coupled to the fiber amplifier and configured to provide the seed optical signal to the fiber amplifier.

12. The optical source of claim 1, wherein the fiber amplifier is ytterbium-doped.

13. The optical source of claim 1, further comprising:
a nonlinear fiber optically coupled to the boost amplifier, the nonlinear fiber broadening a wavelength spectrum of the amplified optical signal to produce a supercontinuum optical signal.

14. The optical source of claim 13, wherein the nonlinear fiber produces a wider and flatter spectrum with the prebroadened optical signal as input, than it would with the input optical signal as input.

15. The optical source of claim 13, wherein the prebroadened optical signal reduces Stimulated Brillouin Scattering back reflection compared to an optical source without the prebroadening fiber.

16. The optical source of claim 13, wherein the supercontinuum optical signal has a power of at least 20 Watts.

17. The optical source of claim 13, wherein the nonlinear fiber broadens the spectrum due to four wavelength mixing.

18. The optical source of claim 13, wherein the nonlinear fiber broadens the spectrum due to Raman scattering.

19. The optical source of claim 13, wherein the nonlinear fiber is a solid material fiber.

20. The optical source of claim 13, wherein the nonlinear fiber is a mid-infrared or far-infrared fiber.

21. The optical source of claim 13, wherein the supercontinuum optical signal is at least 400 nm wide.

* * * * *